United States Patent [19]

Stone, Jr.

[11] 3,974,758

[45] Aug. 17, 1976

[54] APPARATUS FOR REDUCING OXIDATION OF COFFEE

[76] Inventor: Wayne B. Stone, Jr., 7307 Nevis Road, Bethesda, Md. 20034

[22] Filed: Nov. 22, 1974

[21] Appl. No.: 526,154

Related U.S. Application Data

[63] Continuation-in-part of Ser. No. 522,226, Nov. 8, 1974, abandoned, which is a continuation-in-part of Ser. No. 506,858, Sept. 17, 1974, abandoned.

[52] U.S. Cl. .......... 99/275; 99/320

[51] Int. Cl.[2] .......... A23F 1/08

[58] Field of Search .......... 99/275, 279, 283, 292, 99/318–319, 320, 322, 403; 15/246, 246.5; 220/93; 222/166, 326–327, 386.5, 456–457, 465

[56] References Cited

UNITED STATES PATENTS

| | | | |
|---|---|---|---|
| 2,196,959 | 4/1940 | Crothers | 222/326 X |
| 2,211,486 | 8/1940 | Zoia | 220/93 |
| 2,403,404 | 7/1946 | Scott | 99/292 X |
| 2,772,978 | 12/1956 | Shaw | 99/403 X |
| 3,164,289 | 1/1965 | Cocchiarella | 220/93 |
| 3,727,793 | 4/1973 | Staubly | 220/93 |
| 3,781,942 | 1/1974 | Coleman | 15/246.5 |

*Primary Examiner*—Billy J. Wilhite
*Assistant Examiner*—Arthur O. Henderson
*Attorney, Agent, or Firm*—Colton & Stone, Inc.

[57] ABSTRACT

A "pot life" of a quantity of coffee is substantially extended by materially reducing surface area exposure to atmosphere.

In the case of a conventional pour type coffee maker this is effected by isolating the main body of reservoir contained coffee from atmosphere by sealingly engaging a movable follower with respect to the reservoir to isolate the same from atmosphere while permitting pour dispensing of the coffee from a conventional pour spout of small cross-sectional area as compared to the cross-sectional area of the reservoir. The relatively small volume of coffee in the pour spout exhibits only a small surface area exposure to atmosphere and acts, in effect, as a liquid seal which, in cooperation with the movable follower, isolates the reservoir contained coffee from atmosphere.

In the case of a relatively large volumetric capacity urn type coffee maker having a conventional valved dispensing spigot, essentially the same effect can be achieved by employing a movable follower which has a small clearance with respect to the urn sidewall thus eliminating the necessity for effecting a seal between the follower and urn.

5 Claims, 5 Drawing Figures

10
12
14
16
18
20
22
24
26
28
30
32
34
36
38
40
42
44
46
48
50
52
54
56
58
60
62

APPARATUS FOR REDUCING OXIDATION OF COFFEE

CROSS-REFERENCE TO RELATED APPLICATIONS

This is a continuation-in-part of co-pending application Ser. No. 522,226, filed Nov. 8, 1974 now abandoned, which was, in turn, a continuation-in-part of co-pending application Ser. No. 506,858 filed Sept. 17, 1974 now abandoned.

BACKGROUND OF THE INVENTION

The deterioration of coffee, i.e. its acquisition of an "old" or "stale" taste and loss of aroma is due primarily to oxidation. This concept was introduced by the prior of the aforesaid copending applications and reference may be had thereto for a complete background discussion. The latter of the aforesaid copending applications discloses method and apparatus for dispensing coffee from a conventional coffee maker while maintaining the same isolated from atmosphere to preserve the taste and aroma of freshly brewed coffee over extended periods of time which may be measured in days rather than hours. The disclosures in both of the aforesaid applications have been concerned with the preservation of coffee in, and dispensing of coffee from, containers which are positively sealed to preclude any admixture or ingress of atmosphere to the coffee.

Subsequent experiments have shown that if surface area exposure of a contained quantity of coffee is kept small in comparison to the volume of contained coffee the desired result of preserving the freshly brewed taste and aroma may yet be achieved, albeit over a shorter period of time than is possible with a totally sealed quantity of coffee. The pot life or time period within which a heated pot of coffee remains palatable is generally considered to be approximately one hour. Any substantial extension of this pot life has the obvious advantage of reducing coffee wastage and subsequent preparation time of a "fresh pot".

The present invention differs from the coffee makers disclosed and claimed in the latter of the aforesaid co-pending applications in that the present invention is primarily concerned with limiting surface area exposure of the contained coffee as opposed to positively excluding all contact with atmosphere external of the coffee maker.

SUMMARY OF THE INVENTION

The pour spout of a conventional coffee maker has a cross-sectional area which constitutes but a small fraction of the cross-sectional area of the coffee maker reservoir. In conventional practice, the entire body of coffee contained within the coffee maker reservoir as well as the coffee contained within the pour spout is exposed to atmosphere and it is this large surface area exposure which permits the usual rapid oxidation to take place which oxidation is, of course, greatly accelerated by prolonged heating of the coffee. As applied to a pour type coffee maker, the present invention involves the provision of a movable follower which is sealed with respect to the reservoir whereby the reservoir contained coffee is sealed from atmosphere over its relatively large surface area exposure and is, also, sealed in effect from atmosphere by the coffee contained in the pour spout. The coffee contained in the pour spout acts more or less as a liquid seal although such characterization is not entirely accurate since there is open communication between the body of coffee contained in the reservoir and that contained in the pour spout. In any event, the only surface area exposure to air takes place at that relatively small cross section of coffee represented by the upper coffee level in the pour spout. Certainly oxidation is taking place to some extent at this point and some of the coffee that is thus oxidized is transferred back to the main reservoir body by convection, but the overall oxidative effect with respect to the entire volume of contained coffee is so small as to be virtually negligible at least over the first few hours.

In the case of an urn type coffee maker having a valved spigot, the principle is the same but on a somewhat different basis. The two primary distinctions between an urn and pour type coffee maker as pertinent to the present invention are that the urn dispensing spout is valved and thus positively sealed from atmosphere and the volumetric capacity of an urn reservoir is much larger than that of a pour type coffee maker. Thus even when that coffee contained in the urn reservoir is exposed to atmosphere, if that surface area exposure to atmosphere is limited to a small fraction of the total surface area of reservoir contained coffee the deteriorating oxidation that takes place throughout the large volume of contained coffee is negligible over the first few hours.

Tests conducted with a conventional 8 cup, pour type coffee maker wherein the cross-sectional area of the pour spout constituted less than 10% of the cross-sectional area of the reservoir revealed that coffee made and preserved in accordance with the present invention was indistinguishable from freshly brewed coffee after 4 hours and was entirely palatable after eight hours.

A similar result was achieved with a 30 cup urn employing a follower floating on the surface of the reservoir contained coffee with an approximate one-eighth inch clearance between the follower and urn wall.

DESCRIPTION OF THE PREFERRED EMBODIMENTS

Figures 1, 2, 3:
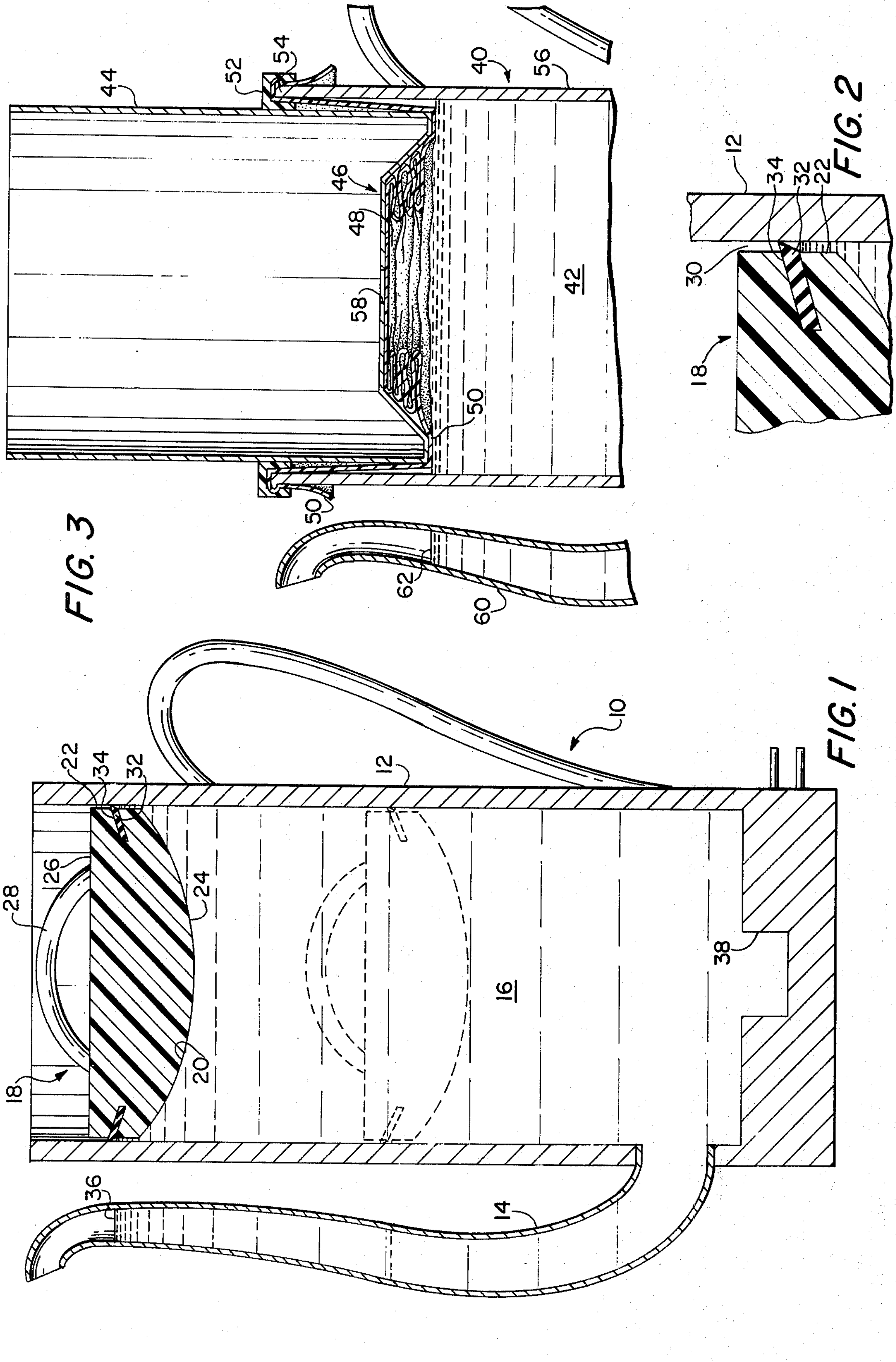
FIG. 1 is a sectional elevation of a domestic pour type coffee maker illustrating a first embodiment of the invention employing a rigid follower.
FIG. 2 is an enlarged detail view illustrating the sealing contact between the follower and reservoir wall.
FIG. 3 is a broken section of the upper portion of a domestic pour type coffee maker identical to that of FIG. 1 but illustrating the use of a flexible follower.

An electric coffee maker 10 is illustrated in FIG. 1 as comprising a cylindrical reservoir 12 in open communication at the lower end thereof with a pour spout 14 whose cross-sectional area comprises a minor fraction of the cross-sectional area of the reservoir. FIG. 1 illustrates the coffee maker filled with freshly brewed coffee 16 after the basket assembly, not shown, has been removed and a follower 18 inserted in the reservoir to rest, or float, upon the surface 20 of the reservoir contained coffee. Follower 18 is constructed as a float structure having a cylindrical peripheral wall 22, of substantial axial extent, merging with a bulged lower wall 24 and an upper planar wall 26 having an upstanding handle 28. The diameter of peripheral wall 22 of float 18 is slightly less than the inner diameter of reservoir 12 and the mass of float structure 18 is selected to displace coffee 16 approximately half way up along the axial extent thereof within clearance 30 as best illustrated in FIG. 2. A thin, soft flexible seal ring 32 is supported in peripheral groove 34 to seal clearance space 30 between the float and reservoir wall 12. The follower 18 may be constructed from any desired float material subject to the requirements that the portion thereof in contact with the coffee be stable at coffee serving temperature and otherwise suitable for food contact purposes. Exemplary construction materials would include hollow stainless steel, glass and various plastics as herein specifically illustrated. Suitable plastics include high density polyethylene and melamine. In addition to the above mentioned heat resistance and food compatibility requirements, the material and physical dimensions of seal ring 32 are selected to insure that the seal effected with the wall of reservoir 12 is of sufficiently light wiping contact that follower 18 may move downwardly as the reservoir coffee level is lowered.

The substantial axial extent of the peripheral wall 22 taken with the relatively small clearance space 30 insures that follower 18 may not tilt substantially out of axial alignment with the reservoir wall when coffee maker 10 is tilted to dispense coffee from pour spout 14. The relatively slight tilt of follower 18 that will tend to take place as the coffee maker is tilted to pour is designed to break the seal at seal ring 32 which will be reestablished when the coffee maker is again placed upright. Even if manufacturing tolerances are exceeded and the seal remains intact, the pouring operation is substantially unimpaired because dispensing of a single cup of coffee does not produce a substantial vapor lock. When the seal is broken during pouring, atmospheric exposure is momentary and to a very small surface area so that the deteriorating effect is negligible.

Although that coffee contained in pour spout 14 is continually exposed to atmosphere at its upper surface 36, this relatively small surface area exposure coupled with the relatively long length of the pour spout and its relatively small volumetric capacity precludes substantial convective transfer of oxidized coffee back into the body of coffee contained in the reservoir.

Coffee 16 is, of course, maintained at drinking temperature in conventional fashion by a thermostatically controlled well heater 38. The descent of follower 18 following several dispensing operations is illustrated in phantom lines in FIG. 1.

The coffee maker 40, fragmentarily shown in FIG. 3, is substantially the same as the coffee maker 10 and differs therefrom in the details of the follower. More specifically, following preparation of the quantity of coffee 42, the basket assembly is removed, a metal sleeve 44 having a lower perforated end wall 46, recessed at 48, is inserted into a flexible bag 50. The sleeve and its telescoping bag are then inserted into the coffee maker until they come to rest upon the initially prepared coffee level. The excess open end of the bag is then folded back around the upper periphery of the reservoir sidewall and an annular locking ring 52, which may be of plastic or the like, is telescoped over sleeve 44 and snapped fitted over flanged rim 54 at the upper end of the coffee maker to seal bag 50 with respect to reservoir 56. It will be apparent that the closed end of bag 50 was collapsed into the recessed portion 48 of sleeve 44 prior to insertion of the same into the coffeepot. This inserting movement resulted in displacement of atmosphere from the reservoir so that only that relatively small amount of air entrapped within the collapsed portion of the bag is present above the coffee level in the reservoir. The lower end 46 of sleeve 44 contains a vent 58 so that the upper surface of the closed end of the bag is exposed to atmosphere.

Although that coffee contained in pour spout 60 is exposed to atmosphere at its upper surface 62, this relatively small surface area exposure combined with the relatively long length of the pour spout and its relatively small volumetric capacity results in only a very small transfer of oxidized coffee back into the main body of coffee contained in the reservoir. As coffee is dispensed, it is apparent that the collapsed portion of the bag will follow the descending coffee level to maintain atmospheric pressure thereon so that dispensing is not impaired.

Figure 4:
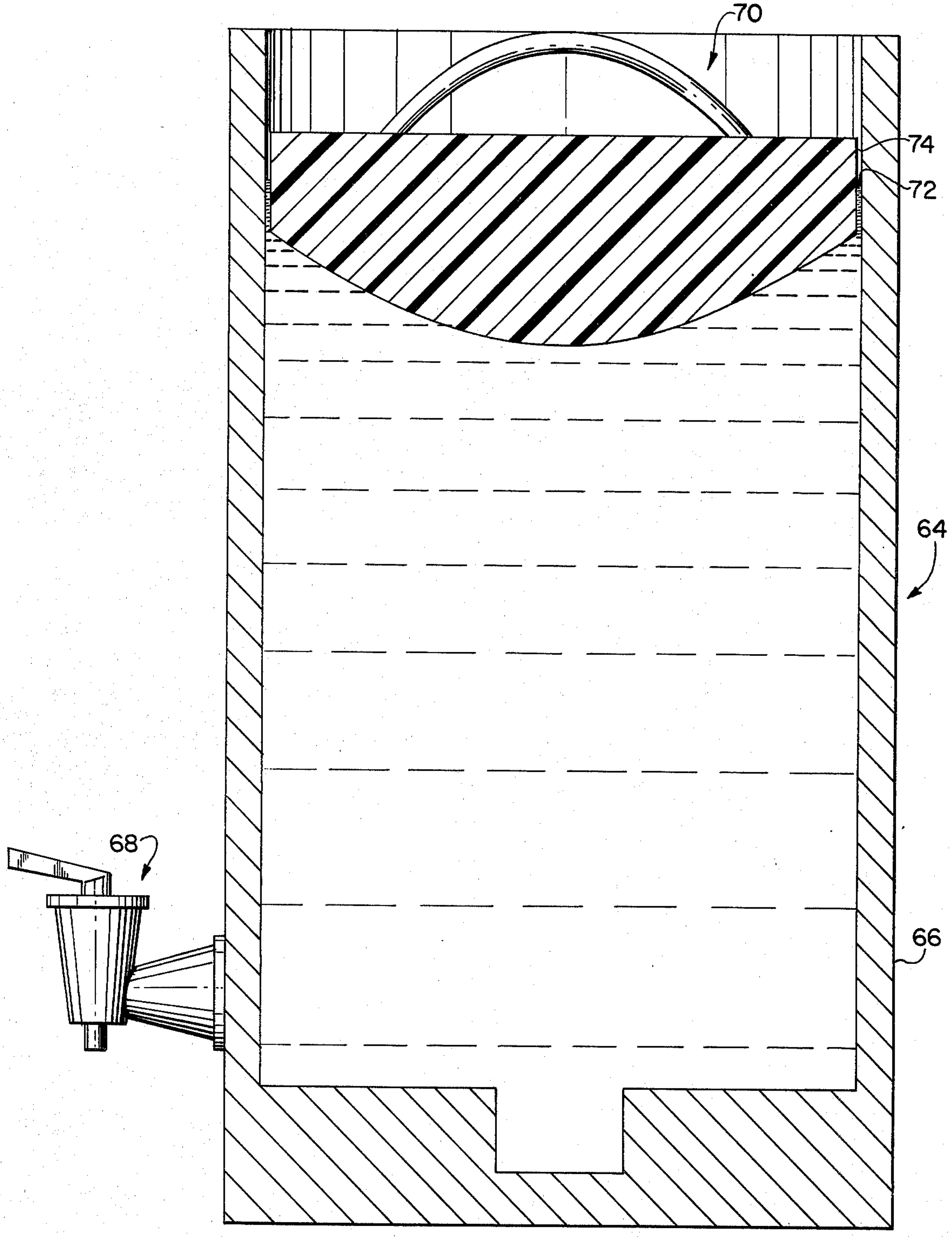
FIG. 4 is a sectional elevation of a conventional urn type coffee maker having a follower dimensioned to a close working clearance with the reservoir wall.
Figure 5:
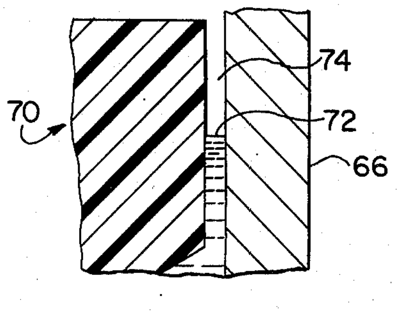
FIG. 5 is an enlarged detail view illustrating a close working clearance between the follower and reservoir wall.

In FIG. 4 is illustrated a conventional electric urn type coffee maker 64 comprising a reservoir 66 and dispensing spout 68 in the form of a valved spigot.

Follower 70 is identical in all respects to the follower 18 of FIG. 1 except that the groove and seal ring are omitted. Thus, the relatively small coffee surface area 72 existent in clearance space 74 between the follower and reservoir wall is continually exposed to atmosphere.

The theory is basically the same as discussed in connection with FIG. 1 except that here the relatively minute surface area exposure to atmosphere takes place continually around the follower rather than at the dispensing spout.

A sealed follower of the type shown in FIG. 1 can, of course, be used with the urn of FIG. 4 to retain all the advantages of a continually sealed system since the urn 64 is not tilted during dispensing and the follower seal would never be broken.

Use of an unsealed follower, such as that shown in FIG. 4, with the pour type coffee maker 10 is less efficient than the other combination shown since there would be continual atmospheric exposure both at the pour spout and follower, nevertheless this combination results in a reasonable extension of pot life up to about two hours. The use of an unsealed follower with a coffee maker having a pour spout in the nature of a pour lip formed at the upper rim thereof yields excellent results with the coffee simply being dispensed through the clearance between the follower and reservoir sidewall.

Irrespective of the combination employed of sealed or unsealed follower and valved or open pour spout; test data to date indicates that in the case of an 8 cup coffee maker having the usual 6 inch diameter reservoir, pot life is extended to about 2 hours when continual surface area exposure is as great as 20 percent and is extended up to about 8 hours when surface area exposure is held below about 5 percent. Pot life rises dramatically as the 5 percent figure is decreased toward zero as would be expected from the disclosures in the aforecited applications wherein the totally sealed systems extend pot life up to several days.

I claim:

1. In a pour type coffee dispensing receptacle having a reservoir and a pour spout openly communicating a lower portion of said reservoir with atmosphere and adapted to contain freshly brewed coffee to an initial level above the communication of said pour spout and reservoir, the improvement comprising; movable imperforate follower means having a surface thereof adapted for positionment in engagement with the initial coffee level in said reservoir and movable through said reservoir in engagement with the coffee level; and means for sealing said movable follower means relative to said reservoir from a first position of said follower means above the communication of said pour spout and reservoir to a second position closer to the communication of said pour spout and reservoir with the other surface of said follower means exposed to atmosphere whereby coffee contained within said reservoir may be isolated from atmosphere external of said reservoir by said follower means and coffee within said pour spout.

2. The coffee dispensing receptacle of claim 1 wherein the cross-sectional area of said pour spout is a minor fraction of the cross-sectional area of said reservoir.

3. The coffee dispensing receptacle of claim 1 wherein said receptacle is a rigid walled coffee maker and includes an electrical heating element.

4. A pour type coffeemaker having a reservoir and a pour spout in open communication at a lower portion of said reservoir, the cross-sectional area of said pour spout comprising a minor fraction of the cross-sectional area of said reservoir, and a quantity of coffee contained within said coffee maker above the level of the communication of said spout and reservoir with the surface area exposure of coffee within said spout constituting a minor fraction of the surface area exposure in said reservoir; and movable follower means sealing said reservoir having opposite surfaces thereof exposed to the coffee in said reservoir and atmosphere, respectively, whereby the reservoir contained coffee is isolated from atmosphere external of said reservoir by said follower means and the coffee within said pour spout.

5. A pour type coffee dispenser comprising a receptacle having a reservoir and a pour spout providing open communication with atmosphere and opening into a lower portion of the reservoir; movable follower means for engagement with an initial coffee level in the reservoir above the opening and movable in response to declining coffee level in the reservoir; and means for sealing the movable follower means relative to the receptacle, the sole communication passage between the reservoir below the follower means and atmosphere being through the pour spout.

* * * * *